(12) United States Patent
Kobayashi (10) Patent No.: US 10,203,441 B2
(45) Date of Patent: Feb. 12, 2019

(54) ILLUMINATING DEVICE, DISPLAY DEVICE, AND PORTABLE ELECTRONIC DEVICE

(71) Applicant: E Ink Corporation, Billerica, MA (US)

(72) Inventor: Hidekazu Kobayashi, Hara-mura (JP)

(73) Assignee: E Ink Corporation, Billerica, MA (US)

( * ) Notice: Subject to any disclaimer, the term of this patent is extended or adjusted under 35 U.S.C. 154(b) by 155 days.

(21) Appl. No.: 15/045,634

(22) Filed: Feb. 17, 2016

(65) Prior Publication Data

US 2016/0259108 A1 Sep. 8, 2016

(30) Foreign Application Priority Data

Mar. 5, 2015 (JP) .................................. 2015-043262

(51) Int. Cl.
*F21V 8/00* (2006.01)
(52) U.S. Cl.
CPC .......... *G02B 6/0016* (2013.01); *G02B 6/002* (2013.01); *G02B 6/0021* (2013.01)
(58) Field of Classification Search
USPC ....................................................... 362/608
See application file for complete search history.

(56) References Cited

U.S. PATENT DOCUMENTS

| | | | | | |
|---|---|---|---|---|---|
| 5,598,280 | A | * | 1/1997 | Nishio | F21V 5/04 349/57 |
| 5,612,563 | A | * | 3/1997 | Fitch | H01L 21/76897 257/329 |
| 7,522,809 | B2 | * | 4/2009 | Yamashita | G02B 6/002 362/615 |
| 8,083,390 | B2 | * | 12/2011 | Ijzerman | G02B 6/002 349/62 |
| 2002/0016028 | A1 | * | 2/2002 | Arao | H01L 27/1214 438/149 |
| 2002/0053735 | A1 | * | 5/2002 | Neuhaus | G06K 19/07752 257/728 |
| 2002/0100930 | A1 | * | 8/2002 | Yaegashi | H01L 21/26513 257/315 |
| 2003/0218169 | A1 | * | 11/2003 | Isobe | B23K 26/0738 257/59 |

(Continued)

FOREIGN PATENT DOCUMENTS

| | | |
|---|---|---|
| JP | 2003-271067 A | 9/2003 |
| JP | 2004-111352 A | 4/2004 |
| JP | 2013-61611 A | 4/2013 |

*Primary Examiner* — Michael G Lee
*Assistant Examiner* — David Tardif
(74) *Attorney, Agent, or Firm* — Antranig Baronian (57) ABSTRACT

An illuminating device includes a light emitting element constituted of a light emitting diode, and a light guide plate including a light receiving section provided on a side face and opposed to the light emitting element. The light guide plate emits illuminating light from a first surface. The light receiving section includes a plurality of cylindrical lens surfaces each formed of a concave curved surface oriented such that an axial direction of the curved surface is parallel to a thickness direction of the light guide plate, the cylindrical lens surfaces being aligned in a direction orthogonal to the axial direction. The cylindrical lens surface is formed of an arcuate surface having a curvature radius of 0.5 mm or less, and more preferably 0.2 mm or less.

16 Claims, 7 Drawing Sheets

(56) References Cited

U.S. PATENT DOCUMENTS

| | | | |
|---|---|---|---|
| 2006/0091398 A1* | 5/2006 | Yamaguchi | H01L 27/1214 257/72 |
| 2006/0157817 A1* | 7/2006 | Yaegashi | H01L 27/105 257/510 |
| 2006/0189126 A1* | 8/2006 | Jang | H01L 21/7684 438/629 |
| 2008/0093464 A1* | 4/2008 | Dairiki | H01L 27/1255 235/492 |
| 2013/0063682 A1 | 3/2013 | Chen et al. | |

* cited by examiner

ILLUMINATING DEVICE, DISPLAY DEVICE, AND PORTABLE ELECTRONIC DEVICE

BACKGROUND

1. Technical Field

The present invention relates to an illuminating device, a display device, and a portable electronic device that include a light guide plate and a light emitting element.

2. Related Art

In display devices including a reflective display panel, an illuminating device called frontlight is employed, because transmitted light is unable to be utilized. In such an illuminating device, light is made incident on a side face of a light guide plate, and illuminating light is emitted through one of the surfaces of the light guide plate in the thickness direction. When the display device is employed in a portable electronic device, a light emitting element such as a light emitting diode is employed as light source. In this case, the display panel has to be evenly illuminated with a fewer number of light emitting elements, from the viewpoint of energy saving.

Figure 7A:
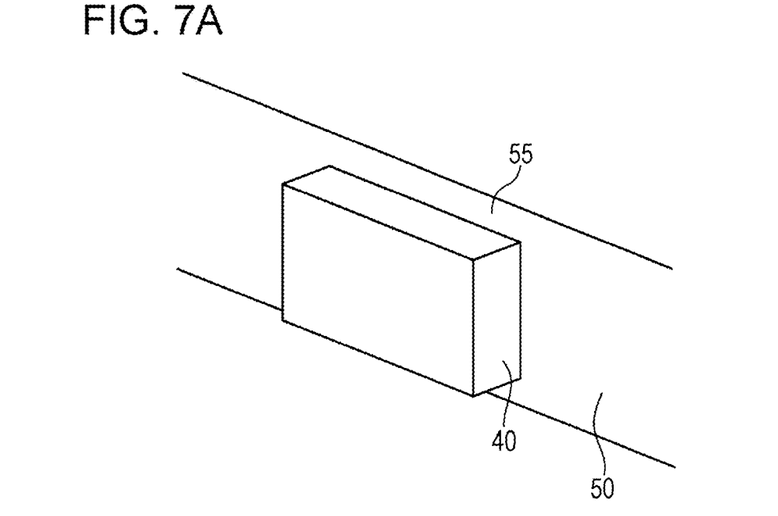
FIGS. 7A and 7B are schematic perspective views for explaining a light receiving section of a light guide plate according to a reference example of the present invention.

However, in the case where a light receiving section 55 of a light guide plate 50 is flat as shown in FIG. 7A, although diverging light is emitted from a light emitting element 40 the light is refracted upon entering the light guide plate 50, and hence the angle of divergence is narrowed. Accordingly, a region P5, where intensity of the illuminating light emitted from the light guide plate 50 is relatively low, widely extends in a region distant from the light receiving section 55 as indicated by a hatched portion in FIG. 5E, and in regions P6 located in the vicinity of the respective end portions of the light receiving section 55, the intensity of the illuminating light becomes significantly lower than in other regions. Here, although the light receiving section 55 of the light guide plate 50 is flat, the decline of the light intensity in the regions P6 in the vicinity of the respective end portions of the light receiving section 55 can be suppressed by locating the light receiving section 55 at a position sufficiently distant from an image display region 1a, which, however, results in an increase in size of the illuminating device.

Figure 7B:
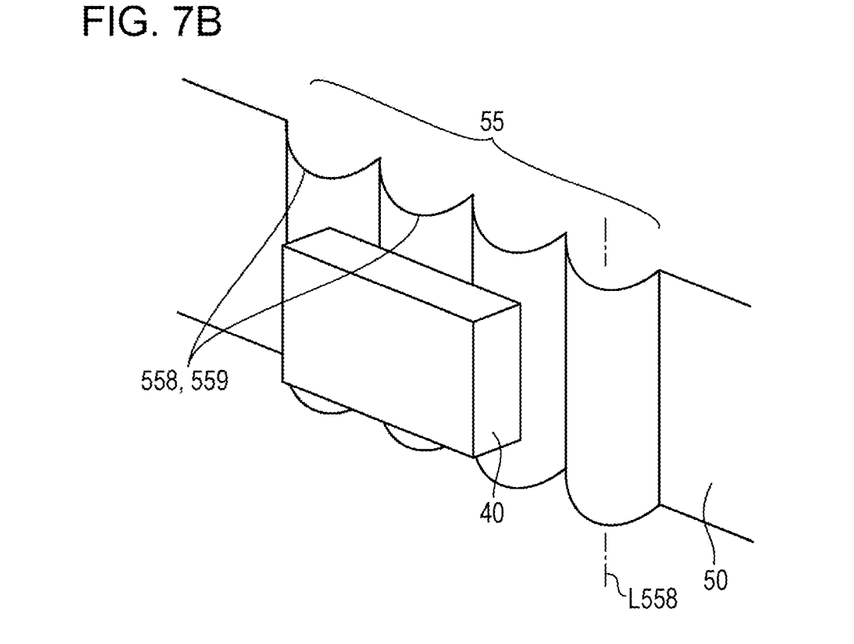

Regarding the light receiving section 55 of the light guide plate 50, for example JP-A-2003-271067 proposes providing a plurality of cylindrical lens surfaces 559 each formed of a convex curved surface 558 oriented such that the axial direction L558 is parallel to the thickness direction of the light guide plate 50, the cylindrical lens surfaces 559 being aligned in the direction orthogonal to the axial direction L558, as shown in FIG. 7B.

With the configuration according to JPA-2003-271067, however, though diverging light is emitted from the light emitting element, the angle of divergence becomes narrower than in the case where the light receiving section is flat. Accordingly, it is difficult to minimize the unevenness of the intensity distribution shown in FIG. 5E. In particular, when a maximum width of the light guide plate, taken in a width direction orthogonal to the direction in which the light emitting element and the light receiving section oppose each other, is by far larger than a width of the portion corresponding to the light receiving section as shown in FIG. 5E, it is difficult to minimize the unevenness of the light intensity shown in FIG. 5E.

An advantage of some aspects of the present invention is provision of an illuminating device that suppresses fluctuation of the intensity of illuminating light emitted from a light guide plate despite a reduced number of light emitting elements being provided, a display device including such an illuminating device, and a portable electronic device including such a display device.

SUMMARY

In an aspect, the present invention provides an illuminating device including a light emitting element, and a light guide plate including a light receiving section located on a side face opposed to the light emitting element and configured to emit illuminating light from one of surfaces opposing in a thickness direction. The light receiving section includes a plurality of cylindrical lens surfaces each formed of a concave curved surface oriented such that an axial direction of the curved surface is parallel to a thickness direction of the light guide plate, the cylindrical lens surfaces being aligned in a direction orthogonal to the axial direction.

In the illuminating device configured as above, the light receiving section in the light guide plate includes a plurality of cylindrical lens surfaces each formed of a concave curved surface oriented such that the axial direction is parallel to the thickness direction of the light guide plate, the cylindrical lens surfaces being aligned in the direction orthogonal to the axial direction. Accordingly, the angle of divergence of the diverging light outputted from the light emitting element is further widened by the cylindrical lens surfaces. Therefore, a sufficient amount of light from the light emitting element reaches the regions in the light guide plate in the vicinity of the respective end portions of the light receiving section. As result, from the one surface of the light guide plate, the illuminating light is emitted with sufficient intensity even from the regions in the vicinity of the respective end portions of the light receiving section, and therefore the unevenness of the intensity of the illuminating light can be minimized. In addition, since the plurality of cylindrical lens surfaces are provided in the light receiving section of the light guide plate, the unevenness of the intensity of the illuminating light can be minimized regardless that the light receiving section and the light emitting element are located close to each other. Therefore, the illuminating device can be made smaller in size.

The foregoing configuration is advantageous especially when the maximum width of the light guide plate, taken in the width direction orthogonal to the direction in which the light emitting element and the light receiving section oppose each other, is larger than the width of the portion corresponding to the light receiving section.

In the illuminating device configured as above, it is preferable that the cylindrical lens surface is formed of an arcuate surface having a curvature radius equal to or less than 0.5 mm, and more preferably equal to or less than 0.2 mm.

In the illuminating device configured as above, the cylindrical lens surfaces adjacent to each other in the direction orthogonal to the axial direction may be directly connected to each other.

In the illuminating device configured as above, a surface parallel to a light emitting surface of the light emitting element may be provided between the cylindrical lens surfaces adjacent to each other in the direction orthogonal to the axial direction.

In the illuminating device configured as above, it is preferable that the light emitting element is a light emitting diode.

In another aspect, the present invention provides a display device including the foregoing illuminating device, and a display panel opposed to the one surface of the light guide plate.

In the display device, the display panel may be a reflective display panel.

The display device configured as above is applicable to various electronic devices, including a portable electronic device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, embodiments of the present invention will be described with reference to the drawings. In the drawings referred to in the following description, layers and components may be illustrated in different reduction scales, for the sake of visual clarity.

Configuration of Display Device

Figure 1A:
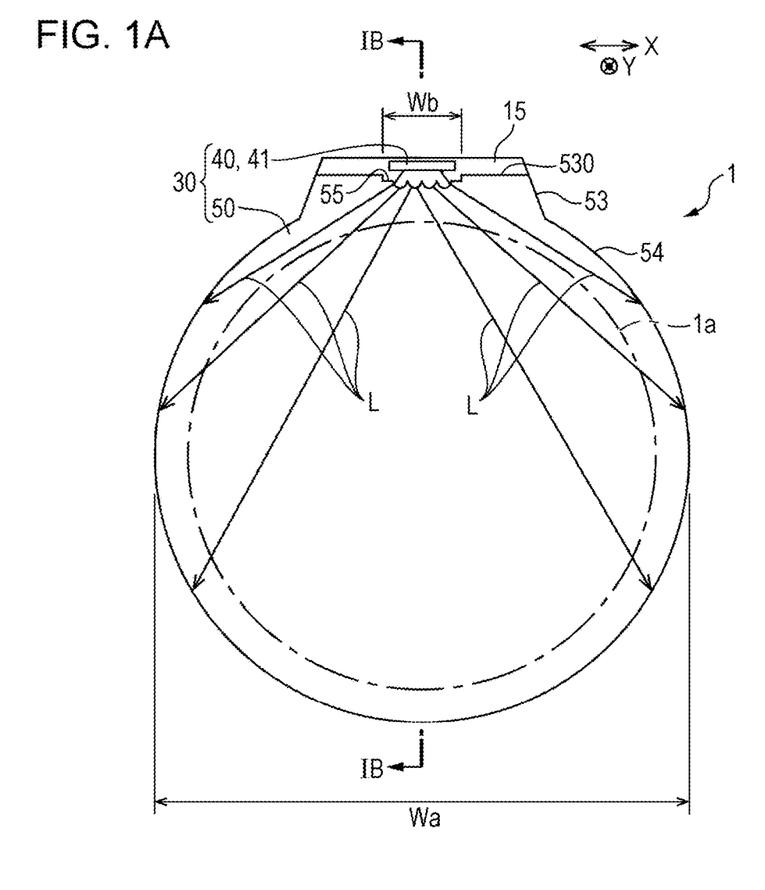
FIG. 1A is a schematic drawing for explaining a display device according to the present invention.
Figure 1B:
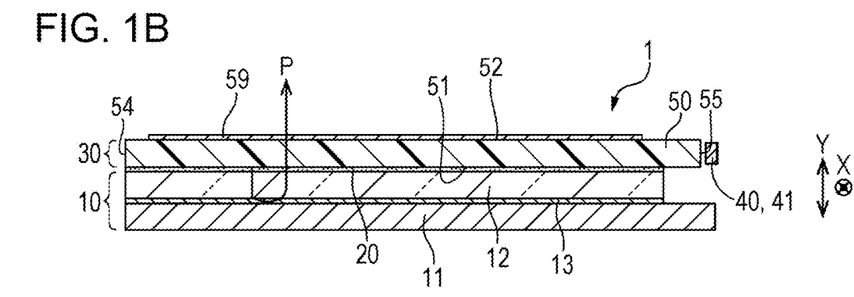
FIG. 1B is a schematic cross-sectional view taken along a line IB-IB in FIG. 1A.

FIGS. 1A and 1B are schematic drawings for explaining a display device according to the present invention, FIG. 1A being a plan view of the display device, and FIG. 1B being a schematic cross-sectional view taken along a line IB-IB in FIG. 1A.

The display device 1 shown in FIG. 1 includes a display panel 10, and an illuminating device 30 including a light guide plate 50 opposed to the display panel 10.

In this embodiment, the display panel 10 is a reflective display panel such as an electrophoretic display panel, a reflective LCD panel, a MEMS element, or an optical interference element, and includes a first substrate 11, a light-transmissive second substrate 12 opposed to the first substrate 11, and a display layer 13 interposed between the first substrate 11 and the second substrate 12. A non-illustrated electrode that drives the display layer 13 is provided on the surface of the first substrate 11 opposing the second substrate 12, as well as on the surface of the second substrate 12 opposing the first substrate 11. In this embodiment, the display panel 10 is an electrophoretic display panel.

In the reflective display panel 10 configured as above, the illuminating light entering through the second substrate 12 is optically modulated by the display layer 13 while being reflected by the display layer 13 and the first substrate 11, and emitted from the second substrate 12 as indicated by an arrow P in FIG. 1B, to thereby display an image.

Configuration of Illuminating Device 30

The illuminating device 30 serves as a so-called frontlight, and includes a light emitting element 40, and the light-transmissive light guide plate 50 including a light receiving section 55 opposed to the light emitting element 40 and located on a side face 54 of the light guide plate 50. In this embodiment, the light guide plate 50 is bonded to the second substrate 12 of the display panel 10 via a light-transmissive adhesive layer 20. The light guide plate 50 is formed of a light-transmissive resin, the refractive index of which is for example 1.5 to 1.6. In this embodiment, the light guide plate 50 is formed of polycarbonate having a refractive index of 1.59.

In the illuminating device 30 configured as above, the light emitted from the light emitting element 40 enters into the light guide plate 50 through the light receiving section 55 of the light guide plate 50, and then proceeds inside the light guide plate 50 while being repeatedly reflected between a first surface 51 and a second surface 52 opposing each other in the thickness direction of the light guide plate 50, and the illuminating light is emitted to the display panel 10 from the first surface 51 (one of surfaces opposing in the thickness direction) located on the side of the display panel 10. The illuminating light, which has been optically modulated in the display panel 10, enters the light guide plate 50 through the first surface 51 of the light guide plate 50 and is emitted through the second surface 52 to thereby display an image. In this embodiment, a light scattering section 59 including bumps and dips is formed on at least one of the first surface 51 and the second surface 52 of the light guide plate 50, in a predetermined distribution pattern. In this embodiment, the light scattering section 59 includes, for example, semispherical bumps having a radius of 60 μm and a height of 10 μm, formed in a pitch of 0.2 mm, and is provided on the second surface 52 of the light guide plate 50.

In this embodiment, the light guide plate 50 has a generally circular flat shape, and a part of the circumference protrudes radially outward thus forming a protruding portion 53. In this embodiment, the leading end portion 530 of the protruding portion 53 is linearly formed, and the light receiving section 55 is located in a portion of the side face 54 of the light guide plate 50 corresponding to the leading end portion 530 of the protruding portion 53. In this embodiment, the light receiving section 55 is located at one position in a central portion of the protruding portion 53 in the direction in which the leading end portion 530 extends. Accordingly, one light emitting element 40 is provided as light source in the illuminating device 30 according to this embodiment. In addition, a maximum width Wa of the light guide plate 50, taken in the width direction orthogonal to the direction in which the light emitting element 40 and the light receiving section 55 oppose each other, is significantly wider than a width Wb of the portion corresponding to the light receiving section 55.

In this embodiment, the display panel 10 has a generally circular flat shape like the light guide plate 50, and includes a protruding portion 15 formed so as to overlap the protruding portion 53 of the light guide plate 50. Here, the display panel 10 may be of a rectangular shape in a plan view, without limitation to the circular shape. In either case, a part of the region where the display panel 10 and the light guide plate 50 overlap is utilized as image display region 1a. In this embodiment, the image display region 1a is a circular region slightly smaller in outer diameter than the light guide plate 50.

Configuration of Light Emitting Element 40

Figure 2A:
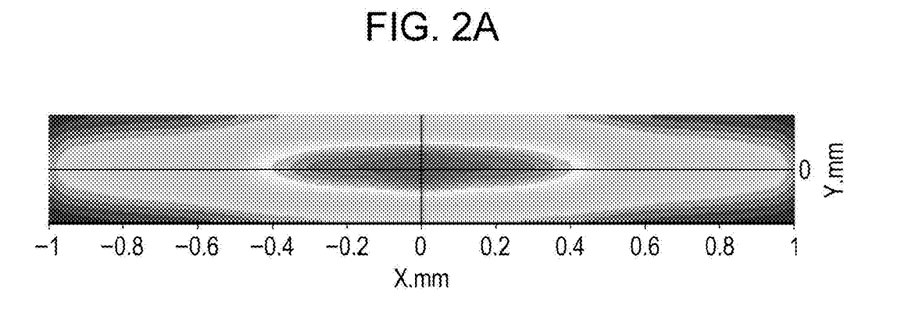
FIGS. 2A to 2C are graphs for explaining a light emitting element employed in an illuminating device and the display device according to the present invention.
Figure 2B:
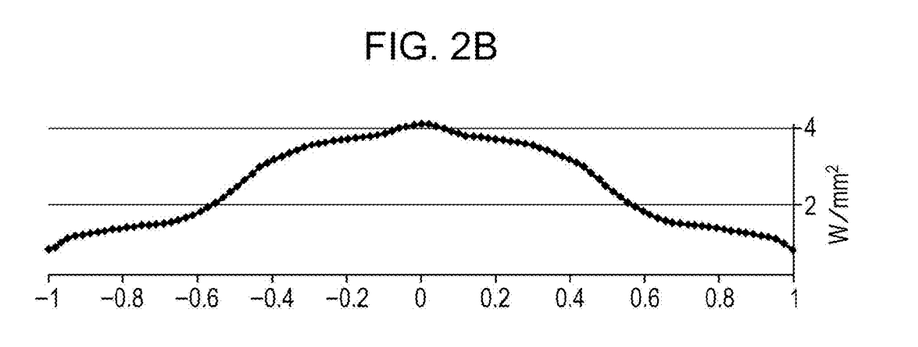
Figure 2C:
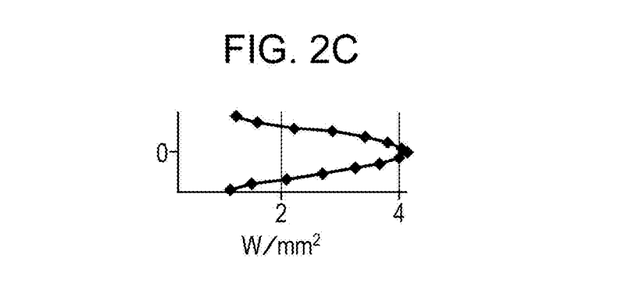

FIGS. 2A to 2C are graphs for explaining the light emitting element 40 employed in the illuminating device 30 and the display device 1 according to the present invention, FIG. 2A being a graph showing the intensity distribution of the source light emitted from the light emitting element 40, FIG. 2B being a graph showing the intensity distribution of the source light in the X-axis direction, and FIG. 2C being a graph showing the intensity distribution of the source light in the Y-axis direction.

The light emitting element 40 described above with reference to FIGS. 1A and 1B is a light emitting diode 41 that emits white light generated by exciting a yellow phosphor with blue light. Accordingly, the light emitting element 40 substantially serves as a generally elliptical surface light source having the major axis oriented in the X-axis direction and the minor axis oriented in the Y-axis direction. In this embodiment, therefore, the light emitting element 40 is disposed such that the minor axis (Y-axis direction) is oriented in the thickness direction of the light guide plate 50, and the major axis (X-axis direction) oriented in the direction in which the side face 54 (light receiving section 55) of the light guide plate 50 extends, as shown in FIGS. 1A and 1B.

Detailed Configuration of Light Introducing Section 55

Figure 3A:
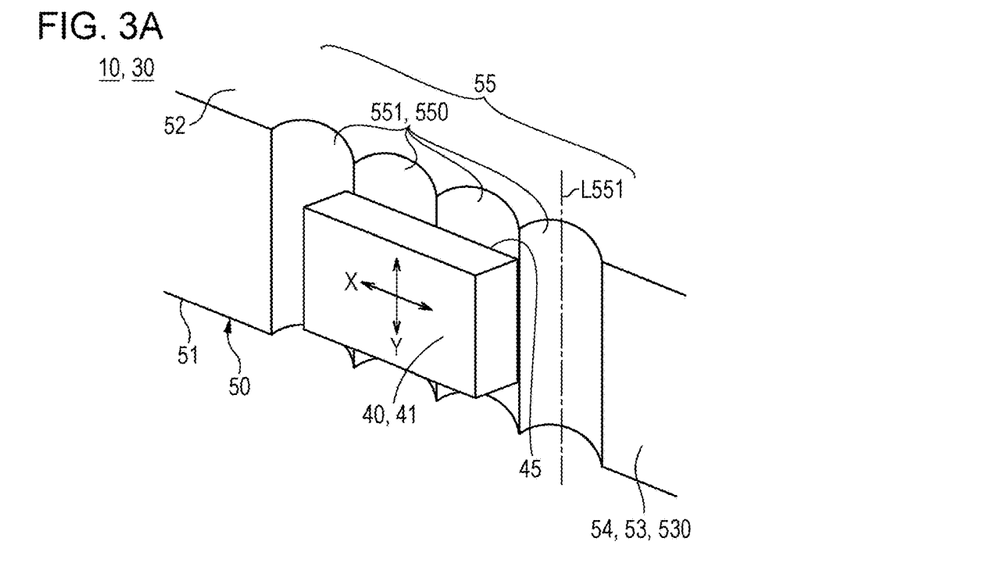
FIGS. 3A to 3C are schematic drawings for explaining a light receiving section of a light guide plate employed in the illuminating device and the display device according to the present invention.
Figure 3B:
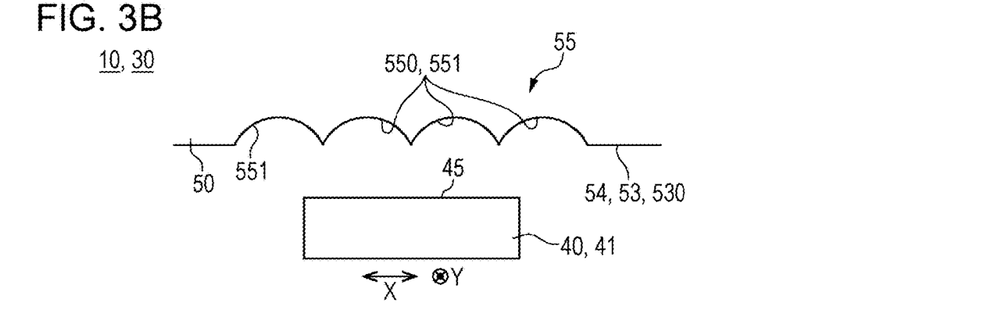
Figure 3C:
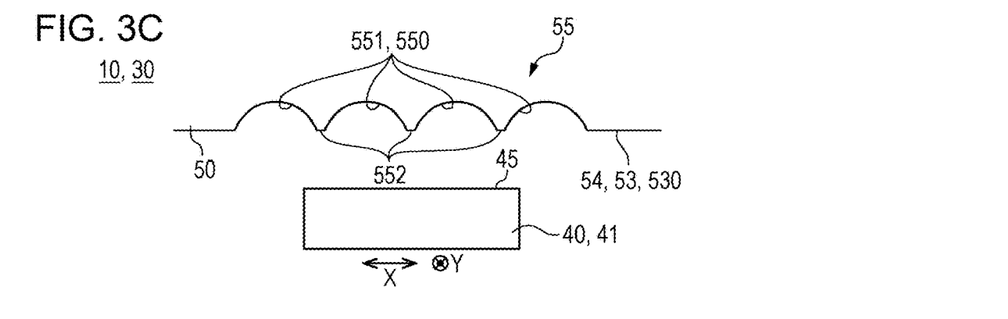
Figure 4A:
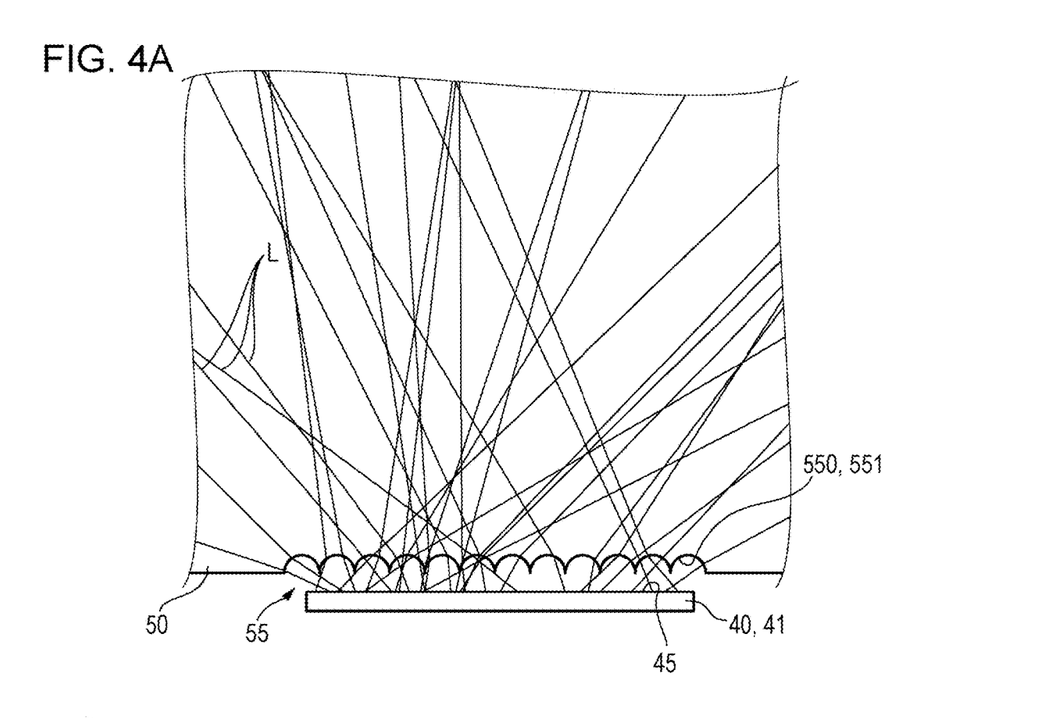
FIGS. 4A and 4B are diagrams for explaining a light ray analysis result with respect to light incident on the light guide plate.
Figure 4B:
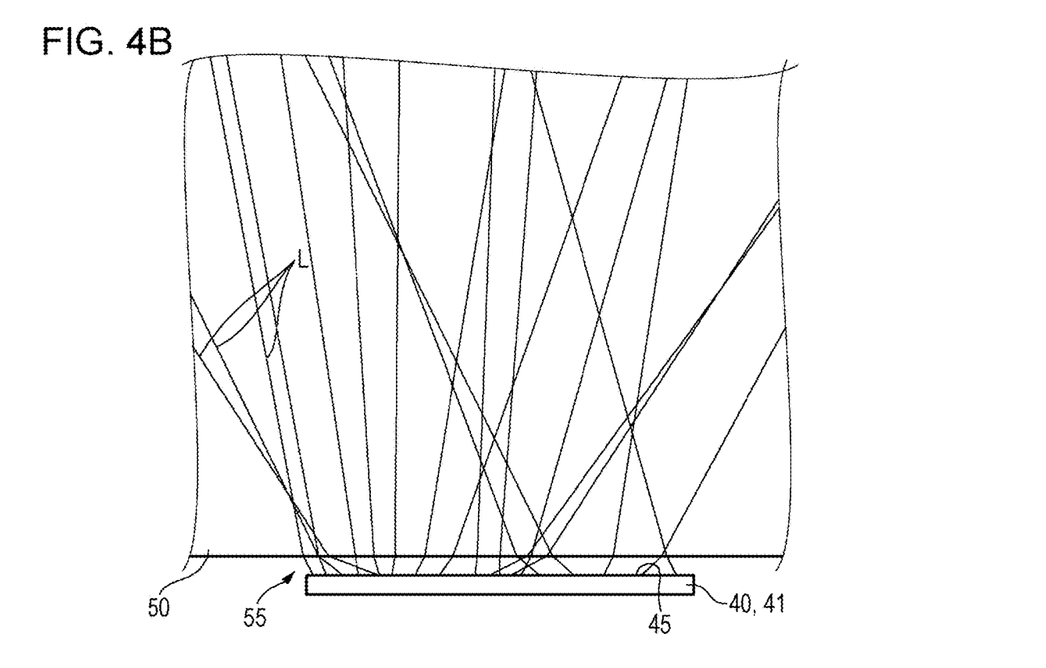

FIGS. 3A to 3C are schematic drawings for explaining the light receiving section 55 of the light guide plate 50 employed in the illuminating device 30 and the display device 1 according to the present invention, FIG. 3A being a perspective view of the light receiving section 55, FIG. 3B being a plan view of the light receiving section 55, and FIG. 3C being a plan view of a variation of the light receiving section 55. FIGS. 4A and 4B are diagrams for explaining a light ray analysis result with respect to the light incident on the light guide plate 50, FIG. 4A representing the case of the light guide plate 50 according to the present invention, and FIG. 4B representing the case of the light guide plate 50 according to a reference example shown in FIG. 7A. FIGS. 5A to 5E are schematic drawings for explaining the intensity distribution of the illuminating light emitted from the light guide plate 50 employed in the illuminating device 30 and the display device 1 according to the present invention. In FIGS. 5A to 5E, the regions where the intensity is relatively low are schematically indicated by hatched portions, on the basis of the intensity simulation result. FIGS. 5A to 5D illustrate the result obtained from the cylindrical lens surface 550 formed of an arcuate surface having a curvature radius of 0.02 mm, 0.05 mm, 0.1 mm, and 0.2 mm respectively, in the light guide plate 50 employed in the illuminating device 30 and the display device 1 according to the present invention. FIG. 5E represents the intensity distribution obtained from the reference example of the light receiving section 55 shown in FIG. 7A.

As shown in FIGS. 3A and 3B, in the light guide plate 50 employed in the illuminating device 30 and the display device 1 according to this embodiment, the light receiving section 55 includes a plurality of cylindrical lens surfaces 550 each formed of a concave curved surface 551 oriented such that an axial direction L551 is parallel to the thickness direction of the light guide plate 50, the cylindrical lens surfaces 550 being aligned in a direction orthogonal to the axial direction L551 (direction in which the side face 54 extends). The respective axial directions L551 of the cylindrical lens surfaces 550 are parallel to one another. Thus, the light receiving section 55 according to this embodiment has a lenticular structure.

In this embodiment, the outer diameter of a light emitting surface 45 of the light emitting element 40 (light emitting diode 41) in the X-axis direction is, for example, 20 mm. On the basis of such a size, the cylindrical lens surface 550 is formed of an arcuate surface having a curvature radius equal to or less than 0.5 mm, and more preferably equal to or less than 0.2 mm. The cylindrical lens surfaces 550 are aligned in a pitch of 0.02 mm to 0.4 mm, and the cylindrical lens surfaces 550 adjacent to each other in the direction orthogonal to the axial direction L551 are directly connected to each other.

In the light receiving section 55 configured as above, the cylindrical lens surfaces 550 each serve as a concave lens having a negative power. Accordingly, the light emitted from the light emitting element 40 is incident on the light receiving section 55 in the form of diverging light, and the angle of divergence of the light is further widened by the plurality of cylindrical lens surface 550 when the light enters the light receiving section 55, as indicated by light rays L in FIG. 4A showing the analysis result. Therefore, a sufficient amount of the light emitted from the light emitting element 40 reaches the regions of the light guide plate 50 in the vicinity of the respective end portions of the light receiving section 55, as shown in FIG. 1A. In other words, the illuminating light is emitted with sufficient intensity from the first surface 51 (one surface) of the light guide plate 50, even from the regions in the vicinity of the respective end portions of the light receiving section 55, and therefore the unevenness of the intensity of the illuminating light can be minimized. In contrast, with the light guide plate 50 according to the reference example shown in FIG. 7A, although the light emitted from the light emitting element 40 is incident on the light receiving section 55 in the form of diverging light, the angle of divergence is narrowed owing to the refraction that takes place when the light enters the light receiving section 55, as indicated by light rays L in FIG. 4B showing the analysis result. Therefore, the light from the light emitting element 40 is unable to effectively reach the regions of the light guide plate 50 in the vicinity of the respective end portions of the light receiving section 55.

Figure 5A:
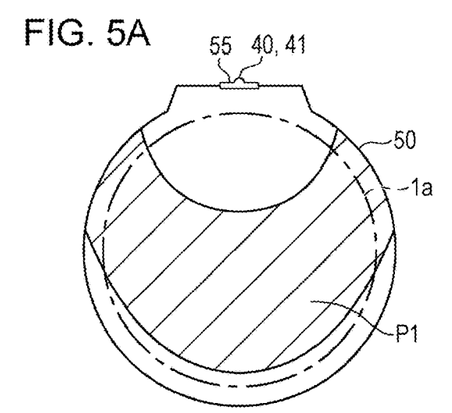
FIGS. 5A to 5E are schematic drawings for explaining intensity distribution of illuminating light emitted from the light guide plate employed in the illuminating device and the display device according to the present invention.

In the case where the cylindrical lens surface 550 of the light guide plate 50 employed in the illuminating device 30 and the display device 1 according to this embodiment is, for example, an arcuate surface having a curvature radius of 0.02 mm, a region P1 where the intensity is relatively low extends in a region distant from the light receiving section 55, as indicated by a hatched portion in FIG. 5A schematically illustrating the intensity distribution. Even in such a case, the intensity in the region P1 is higher than in the region P5 where the intensity is relatively low in the reference example shown in FIG. 5E, and even in the regions P6 (see FIG. 5E) in the vicinity of the respective end portions of the light receiving section 55, the intensity of the illuminating light is prevented from being significantly lower than in the remaining regions.

Figure 5B:
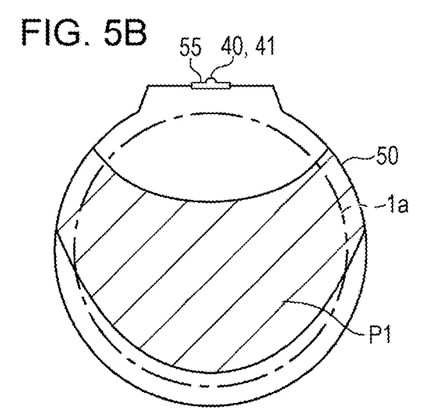

Likewise, in the case where the cylindrical lens surface 550 of the light guide plate 50 employed in the illuminating device 30 and the display device 1 according to this embodiment is, for example, an arcuate surface having a curvature radius of 0.05 mm, a region P1 where the intensity is relatively low extends in a region distant from the light receiving section 55, as indicated by a hatched portion in FIG. 5B schematically illustrating the intensity distribution. Even in such a case, the intensity in the region P1 is higher than in the region P5 where the intensity is relatively low in the reference example shown in FIG. 5E, and even in the regions P6 (see FIG. 5E) in the vicinity of the respective end portions of the light receiving section 55, the intensity of the illuminating light is prevented from being significantly lower than in the remaining regions.

Figure 5C:
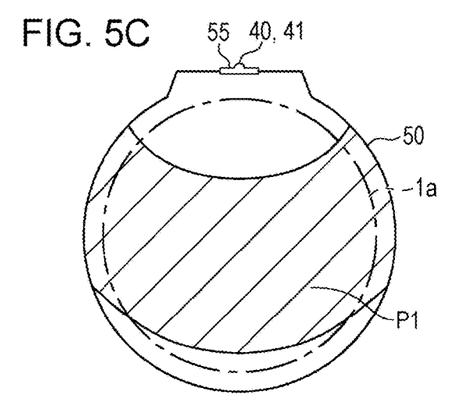

Further, in the case where the cylindrical lens surface 550 of the light guide plate 50 employed in the illuminating device 30 and the display device 1 according to this embodiment is, for example, an arcuate surface having a curvature radius of 0.1 mm, a region P1 where the intensity is relatively low extends in a region distant from the light receiving section 55, as indicated by a hatched portion in FIG. 5C schematically illustrating the intensity distribution. Even in such a case, the intensity in the region P1 is higher than in the region P5 where the intensity is relatively low in the reference example shown in FIG. 5E, and even in the regions P6 (see FIG. 5E) in the vicinity of the respective end portions of the light receiving section 55, the intensity of the illuminating light is prevented from being significantly lower than in the remaining regions.

Figure 5D:
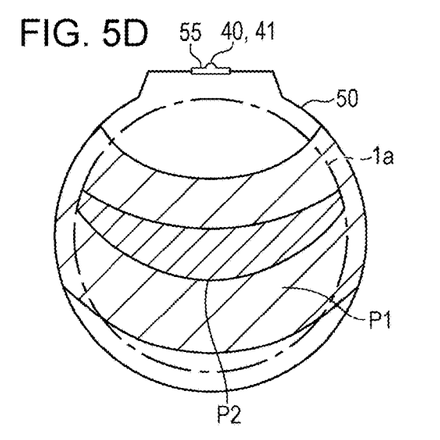
Figure 5E:
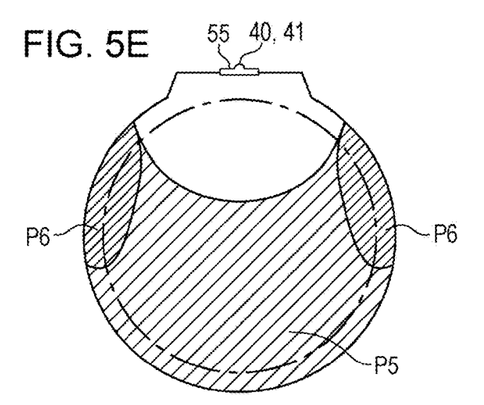

Still further, in the case where the cylindrical lens surface 550 of the light guide plate 50 employed in the illuminating device 30 and the display device 1 according to this embodiment is, for example, an arcuate surface having a curvature radius of 0.2 mm, a region P1 where the intensity is relatively low extends in a region distant from the light receiving section 55, as indicated by a hatched portion in FIG. 5D schematically illustrating the intensity distribution. Even in such a case, the intensity in the region P1 is higher than in the region P5 where the intensity is relatively low in the reference example shown in FIG. 5E, and even in the regions P6 (see FIG. 5E) in the vicinity of the respective end portions of the light receiving section 55, the intensity of the illuminating light is prevented from being significantly lower than in the remaining regions. Here, although a region P2 where the intensity is lower than in the region P1 is created in the region P1 when the cylindrical lens surface 550 is formed of an arcuate surface having a curvature radius of 0.2 mm, the intensity in the region P2 is still higher than in the region P5 where the intensity is relatively low in the reference example shown in FIG. 5E.

Even in the case where the cylindrical lens surface 550 is formed of an arcuate surface having a curvature radius of 0.5 mm, which is not illustrated though, the intensity in the region P1 where the intensity is relatively low is higher than in the region P5 where the intensity is relatively low in the reference example shown in FIG. 5E, and even in the regions P6 (see FIG. 5E) in the vicinity of the respective end portions of the light receiving section 55, the intensity of the illuminating light is prevented from being significantly lower than in the remaining regions. However, when the cylindrical lens surface 550 is formed of an arcuate surface having a curvature radius of 0.5 mm, the region P2 (see FIG. 5D) where the intensity is lower than in the region P1 is prone to be created in the region P1.

In addition, the intensity tends to be lower with an increase in curvature radius of the arcuate surface constituting the cylindrical lens surface 550, because the distance between the light emitting element 40 and the cylindrical lens surface 550 is increased.

Therefore, it is preferable that the cylindrical lens surface 550 is formed of an arcuate surface having a curvature radius equal to or less than 0.5 mm equal to or less than, and more preferably equal to or less than 0.2 mm. More precisely, it is preferable that the cylindrical lens surface 550 is formed of an arcuate surface having a curvature radius equal to or less than 0.1 mm. Conversely, it is preferable that the cylindrical lens surface 550 is formed of an arcuate surface having a curvature radius equal to or larger than 0.02 mm, because the light is prone to diffuse excessively when the curvature radius of the arcuate surface is less than 0.02 mm. Consequently, it is preferable that the cylindrical lens surface 550 is formed of an arcuate surface having a curvature radius not less than 0.02 mm and not exceeding 0.5 mm, and more preferably not less than 0.02 mm and not exceeding 0.2 mm.

Different Configuration of Light Introducing Section 55

In the light guide plate 50 employed in the illuminating device 30 and the display device 1 according to the present invention, described with reference to FIGS. 3A and 3B, the cylindrical lens surfaces 550 adjacent to each other in the direction orthogonal to the axial direction L551 are directly connected to each other. Alternatively, a surface 552 parallel to the light emitting surface 45 of the light emitting element 40 may be provided between the cylindrical lens surfaces 550 adjacent to each other in the direction orthogonal to the axial direction L551, as shown in FIG. 3C.

Advantageous Effects of this Embodiment

As described above, in the light guide plate 50 employed in the illuminating device 30 and the display device 1 according to this embodiment, the light receiving section 55 includes a plurality of cylindrical lens surfaces 550 each formed of a concave curved surface 551 oriented such that an axial direction L551 is parallel to the thickness direction of the light guide plate 50, the cylindrical lens surfaces 550 being aligned in a direction orthogonal to the axial direction L551 (direction in which the side face 54 extends). Accordingly, the light emitted from the light emitting element 40 is incident on the light receiving section 55 in the form of diverging light, and the angle of divergence of the light is further widened by the plurality of cylindrical lens surface 550 when the light enters the light receiving section 55, as indicated by light rays L in FIG. 1A and FIG. 4A. Therefore, a sufficient amount of the light emitted from the light emitting element 40 reaches the regions of the light guide plate 50 in the vicinity of the respective end portions of the light receiving section 55, as shown in FIG. 1A. In other words, the illuminating light is emitted with sufficient intensity from the first surface 51 (one surface) of the light guide plate 50, even from the regions in the vicinity of the respective end portions of the light receiving section 55, and therefore the unevenness of the intensity of the illuminating light can be minimized.

Further, since the light receiving section 55 includes the plurality of cylindrical lens surfaces 550, the unevenness of the intensity of the illuminating light can be minimized despite the light receiving section 55 and the light emitting element 40 being located close to each other. Therefore, the illuminating device 30 can be made smaller in size. In the case where the light receiving section 55 is formed of a single large concave curved surface (cylindrical lens surface) as a whole, the light emitting element 40 has to be located distant from the light receiving section 55, which results in an increase in size of the illuminating device 30, however the configuration according to this embodiment prevents such an increase in size.

Other Embodiments

In the foregoing embodiment, the light receiving section 55 is located at one position and one light emitting element 40 is provided. However, a plurality of light receiving sections 55 may be provided, for example along the leading end portion 530 of the protruding portion 53, and the plurality of light receiving sections 55 may each include one light emitting element 40. In this case, the width Wb of the portion corresponding to the light receiving section 55 is taken between the end portions of the region including the plurality of light receiving sections 55. In addition, although the light guide plate 50 has a generally circular flat shape in the foregoing embodiment, light guide the plate 50 may be formed in a different shape, for example a rectangular flat shape. Further, the illuminating device 30 is configured as a frontlight in the foregoing embodiment since the display panel 10 is a reflective display panel, however a transmissive display panel may be employed as display panel 10, to utilize the illuminating device 30 as a backlight. Still further, the illuminating device 30 according to the present invention may be applied to a photo frame for displaying photos, a sign for displaying advertisements, instruments installed in automobiles, and so forth.

Configuration of Portable Electronic Device

Figure 6:
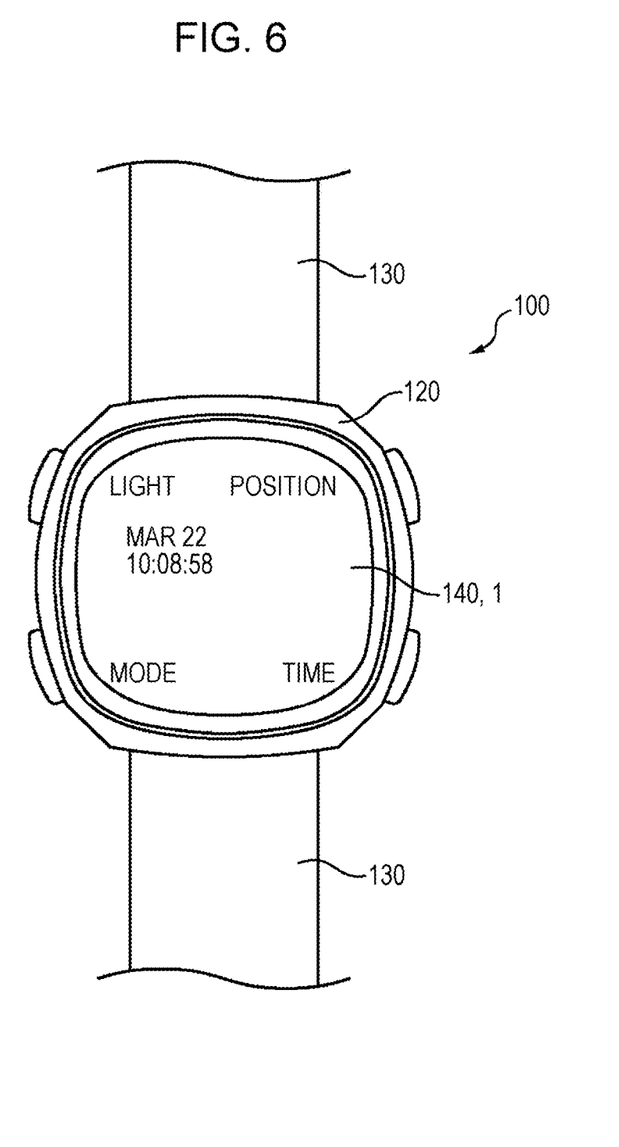
FIG. 6 is a schematic front view of a portable electronic device including the display device according to the present invention.

FIG. 6 is a schematic front view of a portable electronic device 100 including the display device 1 according to the present invention. The portable electronic device 100 shown in FIG. 6 is an electronic apparatus to be worn by a person on his/her arm, and includes a main body 120 and a strap 130. The main body 120 is incorporated not only with a clock function but also with a function of the global positioning system (GPS) which is a kind of the satellite navigation system, and so forth. A display unit 140 is provided in the central region of the main body 120, and the display device 1 described above with reference to FIGS. 1A and 1B and other drawings is provided in the display unit 140, so as to display a current time of day, position information, and so forth.

The display device 1 according to the present invention may be utilized as a display device of a mobile phone, a personal digital assistants (PDA), a viewfinder of a camera, an electronic paper, and so forth, in addition to the portable electronic device 100 shown in FIG. 6.

The entire disclosure of Japanese Patent Application No. 2015-043262, filed Mar. 5, 2015 is expressly incorporated by reference herein.

What is claimed is:

1. An illuminating device comprising:
a light emitting element; and
a light guide plate including a light receiving section located on a side face opposed to the light emitting element and configured to emit illuminating light from one of a first surface and a second surface which oppose each other in a thickness direction,
wherein the light receiving section includes a plurality of cylindrical lens surfaces each formed of a concave curved surface formed in an edge of the light guide plate and curving inward from the edge of the light guide plate toward a middle portion of the light guide plate and away from the light emitting element and oriented such that an axial direction of the curved surface is parallel to a thickness direction of the light guide plate, the cylindrical lens surfaces being aligned in a direction orthogonal to the axial direction.

2. The illuminating device according to claim 1,
wherein a maximum width of the light guide plate, taken in a width direction orthogonal to a direction in which the light emitting element and the light receiving section oppose each other, is larger than a width of a portion corresponding to the light receiving section.

3. The illuminating device according to claim 1,
wherein the cylindrical lens surfaces are each formed of an arcuate surface having a curvature radius equal to or less than 0.5 mm.

4. The illuminating device according to claim 3,
wherein the cylindrical lens surfaces are each formed of an arcuate surface having a curvature radius equal to or less than 0.2 mm.

5. The illuminating device according to claim 1,
wherein the cylindrical lens surfaces adjacent to each other in a direction orthogonal to the axial direction are directly connected to each other.

6. The illuminating device according to claim 1,
wherein a surface parallel to a light emitting surface of the light emitting element is provided between the cylindrical lens surfaces adjacent to each other in a direction orthogonal to the axial direction.

7. The illuminating device according to claim 1,
wherein the light emitting element is a light emitting diode.

8. A display device comprising:
the illuminating device according to claim 1; and
a display panel opposed to one of the first surface and the second surface of the light guide plate.

9. A display device comprising:
the illuminating device according to claim 2; and
a display panel opposed to one of the first surface and the second surface of the light guide plate.

10. A display device comprising:
the illuminating device according to claim 3; and
a display panel opposed to one of the first surface and the second surface of the light guide plate.

11. A display device comprising:
the illuminating device according to claim 4; and
a display panel opposed to one of the first surface and the second surface of the light guide plate.

12. A display device comprising:
the illuminating device according to claim 5; and
a display panel opposed to one of the first surface and the second surface of the light guide plate.

13. A display device comprising:
the illuminating device according to claim 6; and
a display panel opposed to one of the first surface and the second surface of the light guide plate.

14. A display device comprising:
the illuminating device according to claim 7; and
a display panel opposed to one of the first surface and the second surface of the light guide plate.

15. The display device according to claim 8,
wherein the display panel is a reflective display panel.

16. A portable electronic device comprising the display device according to claim 8.

* * * * *